(12) United States Patent
Cure et al.

(10) Patent No.: US 11,446,649 B2
(45) Date of Patent: Sep. 20, 2022

(54) THREE-PART NANO-CATALYST AND USE THEREOF FOR PHOTOCATALYSIS

(71) Applicants: Centre national de la recherche scientifique, Paris (FR); Jérémy Cure, Le Nayrac (FR); UNIVERSITE DE RENNES 1, Rennes (FR); UNIVERSITE PAUL SABATIER TOULOUSE III, Toulouse (FR)

(72) Inventors: Jérémy Cure, Le Nayrac (FR); Myrtil Kahn, Toulouse (FR); Kévin Cocq, Toulouse (FR); Gérald Casterou, Cintegabelle (FR); Rémi Chauvin, Toulouse (FR); Valérie Maraval, Soreze (FR); Hala Assi, Toulouse (FR)

(73) Assignees: CENTRE NATIONAL DE LA RECHERCHE SCIENTIFIQUE, Paris (FR); Jérémy Cure, Le Nayrac (FR); UNIVERSITÉ DE RENNES 1, Rennes (FR); UNIVERSITÉ PAUL SABATIER TOULOUSE III, Toulouse (FR)

( * ) Notice: Subject to any disclaimer, the term of this patent is extended or adjusted under 35 U.S.C. 154(b) by 547 days.

(21) Appl. No.: 16/342,589

(22) PCT Filed: Oct. 16, 2017

(86) PCT No.: PCT/FR2017/052842
§ 371 (c)(1),
(2) Date: Apr. 17, 2019

(87) PCT Pub. No.: WO2018/073525
PCT Pub. Date: Apr. 26, 2018

(65) Prior Publication Data
US 2019/0255517 A1    Aug. 22, 2019

(30) Foreign Application Priority Data

Oct. 17, 2016   (FR) .................................... 16 60040

(51) Int. Cl.
| | | |
|---|---|---|
| B01J 31/00 | (2006.01) | |
| B01J 31/22 | (2006.01) | |
| B01J 19/12 | (2006.01) | |
| B01J 23/06 | (2006.01) | |
| B01J 31/26 | (2006.01) | |
| B01J 35/00 | (2006.01) | |
| B01J 37/04 | (2006.01) | |
| B01J 37/34 | (2006.01) | |
| C01B 3/04 | (2006.01) | |
| C01B 13/02 | (2006.01) | |
| B01J 23/80 | (2006.01) | |
| B01J 23/52 | (2006.01) | |
| B01J 23/50 | (2006.01) | |
| B01J 31/06 | (2006.01) | |
| B01J 21/06 | (2006.01) | |
| B01J 23/54 | (2006.01) | |
| B01J 23/72 | (2006.01) | |
| B01J 21/02 | (2006.01) | |

(52) U.S. Cl.
CPC ......... B01J 31/2295 (2013.01); B01J 19/123 (2013.01); B01J 19/127 (2013.01); B01J 21/063 (2013.01); B01J 23/06 (2013.01); B01J 23/50 (2013.01); B01J 23/52 (2013.01); B01J 23/54 (2013.01); B01J 23/72 (2013.01); B01J 23/80 (2013.01); B01J 31/069 (2013.01); B01J 31/26 (2013.01); B01J 35/004 (2013.01); B01J 35/0013 (2013.01); B01J 37/04 (2013.01); B01J 37/345 (2013.01); C01B 3/042 (2013.01); C01B 13/0207 (2013.01); *B01J 21/02* (2013.01); *B01J 2219/0877* (2013.01); *B01J 2219/0892* (2013.01); *B01J 2219/1203* (2013.01); *Y02E 60/36* (2013.01)

(58) Field of Classification Search
None
See application file for complete search history.

(56) References Cited

U.S. PATENT DOCUMENTS

| | | | | |
|---|---|---|---|---|
| 6,063,849 A | * | 5/2000 | Morris ................. | C09D 5/1618 523/122 |
| 2012/0267234 A1 | * | 10/2012 | Reece .................... | B01J 35/004 204/157.5 |
| 2013/0309160 A1 | | 11/2013 | Kahn | |

(Continued)

FOREIGN PATENT DOCUMENTS

| | | |
|---|---|---|
| WO | 2012/080425 | 6/2012 |
| WO | 2014/169258 | 10/2014 |

(Continued)

OTHER PUBLICATIONS

Diercks et al, hexaethynylbenzene, angew. chem. int. ed. engl. 25. No. 3, 268-269 (Year: 1986).*
Li et al, Architecture of graphdiyne nanoscale films, chem. commun. 46, 3256-3258 (Year: 2010).*
Li et al, Designed Synthesis of a Highly Conjugated Hexaethynylbenzene-Based Hostfor Supramolecular Architectures, Chem. Asian J., 9, 2842-2849 (Year: 2014).*
Kang et al, Gold nanoparticles/ZnO nanorods hybrids for enhanced reactive oxygen species generation and photodynamic therapy. nanosearch, pp. 1=12 (Year: 2015).*

(Continued)

*Primary Examiner* — Stefanie J Cohen
(74) *Attorney, Agent, or Firm* — Nixon & Vanderhye (57) ABSTRACT

Disclosed is a nanocatalyst-type nanoscale composition including a nanoparticle semiconductor, plasmonic metal nanoparticles and an organic photosensitiser of the carbomer type. Also disclosed is a method for producing such a nano-catalyst. Also disclosed is use of the nanocatalyst for photoelectrolysis, in particular, for the photoelectrolysis of water, as well as to a power source including the nanocatalyst.

19 Claims, 6 Drawing Sheets

(56) References Cited

U.S. PATENT DOCUMENTS

| | | |
|---|---|---|
| 2016/0160364 A1 | 6/2016 | Juluri et al. |
| 2016/0346763 A1 | 12/2016 | Wahab |
| 2016/0367968 A1 | 12/2016 | Guerrero |
| 2017/0274364 A1 | 9/2017 | Idriss |

FOREIGN PATENT DOCUMENTS

| | | |
|---|---|---|
| WO | 2015/059503 | 4/2015 |
| WO | 2015/118424 | 8/2015 |
| WO | 2016/030753 | 3/2016 |

OTHER PUBLICATIONS

Hongjie Tang, et al. "Two-Dimensional Carbon Leading to New Photoconversion Processes" Chemical Society Reviews; vol. 43, No. 13; Mar. 20, 2014; pp. 4281-4299.

Shou Wang, et al; "A Novel and Highly Efficient Photocatalyst Based on P25-Graphdiyne Nanocomposite"; Small; vol. 8, No. 2; Nov. 29, 2011; pp. 265-271.

Kevin Cocq, et al.; "Carbo-Aromaticity and Novel Carbo-Aromatic Compounds"; Chemical Society Reviews; vol. 44, No. 18; Jun. 16, 2015; pp. 6535-6559.

International Search Report, dated Jan. 12, 2018, from corresponding PCT application No. PCT/FR2017/052842.

* cited by examiner

THREE-PART NANO-CATALYST AND USE THEREOF FOR PHOTOCATALYSIS

FIELD OF THE INVENTION

The present invention relates to a composition on nanometric scale of nano-catalyst type, and to a method for producing the nano-catalyst.

The present invention also concerns the use of the nano-catalyst of the invention for photocatalysis, in particular for photoelectrolysis of water.

STATE OF THE ART

The search for new sources of clean energy is a particularly critical issue of our times. The production of hydrogen via water-splitting with visible light is a promising pathway using water and sunlight i.e., an abundant raw material and illimited energy source on human scale. This method is therefore of major economic and environmental interest.

One of the most promising methods concerns the photocatalytic conversion of water to hydrogen. This requires the use of a photocatalyst able to absorb sunlight and to generate charges allowing oxidoreduction of water, thereby producing hydrogen. Among the numerous metal or organometallic photocatalysts which have been developed over recent decades, nano-catalysts have been the subject of particular focus on account of their high specific surface area imparting improved catalytic efficacy thereto.

Semiconductor metal oxides are often included in these nano-catalysts, zinc oxide (ZnO) and titanium oxide ($TiO_2$) being the most frequently used. Zinc oxide (ZnO) is an n-type semiconductor having advantageous properties for use thereof as photocatalyst such as high transparency, strong electron mobility, high thermal conductivity, wide direct band gap (3.37 eV) and high exciton binding energy (60 meV). Additionally, it has satisfactory thermal and chemical stability, particularly in an aqueous medium, and is of moderate ecological footprint.

Nonetheless, ZnO and $TiO_2$ semiconductors, which both have a wide direct band gap, do not absorb in the visible range of the solar spectrum but solely in the UV range. For use as efficient photocatalyst it appears necessary to increase the absorption range of the material so that it covers a wider range of the solar spectrum. Various methods have been proposed to improve the photo-electrochemical efficiency of nano-catalysts: for example modifying the three-dimensional structure of the semiconductor; coupling with another semiconductor having a smaller direct band-gap; associating the semiconductor with a metal having plasmonic properties in the visible range; including other metals or non-metals («doping») in the crystalline structure of the semiconductor; associating with organic or organometallic chromophores acting as photo-sensitizers; creating defects in the semiconductor structure; developing and integrating complexes on nanoparticles, the former mimicking the active centre of enzymes of hydrogenase type (e.g. Ni/Fe); or developing nanoparticles within peptides in a biological medium.

However, the nano-catalysts thus improved exhibit yields that are still unsatisfactory and have a limited lifetime. In addition, the production of these nano-catalysts is complex and costly. There is therefore a need for novel nano-catalysts that are simpler to produce, with better performance and/or more durable, in particular for the production of hydrogen via photo-reduction of water.

The applicant has designed and prepared a novel three-part nanoparticulate nano-catalyst comprising the association of a semiconductor, preferably nanoparticulate or in nanorod form, with nanoparticles of metal having plasmonic properties and an organic photosensitizer. The applicant has found that this triad surprisingly has suitable photo-electrochemical properties for use as photocatalyst, in particular for the photo-reduction of water and production of hydrogen.

SUMMARY

The present invention concerns a three-part nano-catalyst comprising:
- a semiconductor, nanoparticulate or in the form of nanorods;
- nanoparticles of plasmonic metal; and
- an organic photosensitizer that is a carbo-mer, preferably a carbo-benzene or carbo-n-butadiene.

In one embodiment, the semiconductor in nanoparticulate or nanorod form is a metal oxide, preferably tin oxide, indium oxide, gallium oxide, tungsten oxide, copper oxide, nickel oxide, cobalt oxide, iron oxide, zinc oxide or titanium oxide, more preferably zinc oxide or titanium oxide.

In one embodiment, the plasmonic metal is gold, silver, copper, aluminium or platinum, preferably gold, silver or copper, more preferably silver.

In one embodiment, the carbo-mer is a carbo-benzene, preferably 4-[10-(4-aminophenyl)-4,7,13,16-tetraphenylcyclooctadeca-1,2,3,7,8,9,13,14,15-nonaen-5,11,17-triyn-1-yl]aniline or 4,4'((4,7,13,16-tetraphenylcyclooctadeca-1,2,3,7,8,9,13,14,15-nonaen-5,11,17-triyne-1,10-diyl)bis(ethyne-2,1-diyl))dianiline, more preferably 4,4'((4,7,13,16-tetraphenylcyclooctadeca-1,2,3,7,8,9,13,14,15-nonaen-5,11,17-triyne-1,10-diyl)bis(ethyne-2,1-diyl))dianiline.

In embodiment, the nanoparticles of plasmonic metal are located on the surface of the metal oxide of the semiconductor in nanoparticulate or nanorod form.

In one embodiment, the nanoparticles of plasmonic metal are located on the surface of the semiconductor in nanoparticulate or nanorod form.

In one embodiment, the nanoparticulate semiconductor metal oxide and/or nanoparticles of plasmonic metal are coated with the photosensitizer.

In one embodiment, the semiconductor in nanoparticulate or nanorod form and/or the nanoparticles of plasmonic metal are coated with the photosensitizer.

The present invention also concerns a method for producing the three-part nano-catalyst, comprising the following steps:
(1a) mixing a semiconductor in nanoparticulate or nanorod form, preferably a semiconductor metal oxide, with an organic photosensitizer;
(1b) mixing the composition obtained at step (1a) with an organometallic complex of a plasmonic metal; optionally followed by an agitation step (1c); and
(2) irradiating the composition obtained at step (1b) under electromagnetic radiation, preferably under sunlight.

In one embodiment, the method for producing the three-part nano-catalyst comprises the following steps:
(1a) mixing a semiconductor in nanoparticulate or nanorod form, with an organic photosensitizer;
(1b) mixing the composition obtained at step (1a) with a complex comprising an ion of a plasmonic metal; optionally followed by an agitation step (1c); and
(2) irradiating the composition obtained at step (1b) under electromagnetic radiation, preferably under sunlight.

In one embodiment, the organometallic complex of a plasmonic metal is a complex of an amidinate or carboxylate of silver, gold, copper, aluminium or platinum, preferably a complex of silver amidinate.

In one embodiment, the organometallic complex comprises the association of at least one organic ion with at least one ion of a plasmonic metal. In one embodiment, the organometallic complex comprises the association of at least one organic anion with at least one cation of a plasmonic metal. In one embodiment, the organometallic complex comprises the association of at least one organic anion, selected from among amidinates or carboxylates, with at least one cation of a plasmonic metal. In one embodiment, the organometallic complex is an amidinate or carboxylate of silver, gold, copper, aluminium or platinum, preferably a silver amidinate.

The present invention also concerns the use of the three-part nano-catalyst to produce hydrogen.

The present invention also concerns a power supply device, preferably a mobile power supply device comprising the three-part nano-catalyst.

Definitions

In the present invention, the terms below are defined in the following manner:

«Alkyl» concerns any saturated, straight-chain, branched or cyclic hydrocarbon chain having 1 to 12 carbon atoms, preferably 1 to 6 carbon atoms such as methyl, ethyl, n-propyl, isopropyl, n-butyl, sec-butyl, isobutyl, tertio-butyl, pentyl and isomers thereof (e.g. n-pentyl, iso-pentyl), hexyl and isomers thereof (e.g. n-hexyl, iso-hexyl).

«Alkenyl» concerns any straight-chain, branched or cyclic hydrocarbon chain having at least one double bond, 2 to 12 carbon atoms, preferably 2 to 6 carbon atoms, and not comprising an aromatic ring; e.g. vinyl or allyl.

«Alkynyl» concerns any straight-chain, branched or cyclic hydrocarbon chain having at least one triple bond, 2 to 12 carbon atoms, preferably 2 to 6 carbon atoms, and not comprising an aromatic ring; e.g. ethynyl, 2-propynyl, 2-butynyl, 3-butynyl, 2-pentynyl and isomers thereof, 2-hexynyl and isomers thereof.

«Aryl» concerns an aromatic polyunsaturated hydrocarbyl group having a single ring (e.g. phenyl) or several fused aromatic rings (e.g. naphthyl) or bonded via single covalence (e.g. biphenylyl), typically having 5 to 20 carbon atoms, preferably 6 to 12 wherein at least one ring is aromatic. The aromatic ring can optionally include one to two additional rings (i.e. cycloalkyl, heterocyclyl or heteroaryl) fused thereto. Nonlimiting examples of aryl groups comprise the groups phenyl, biphenylyl, biphenylenyl, 5 or 6 tetralinyl, naphthalene-1- or -2-yl, 4, 5, 6 or 7-indenyl, 1-2-, 3-, 4- or 5-acenaphthylenyl, 3-, 4- or 5-acenaphtenyl, 1- or 2-pentalenyl, 4- or 5-indanyl, 5-, 6-, 7- or 8-tetrahydronaphthyl, 1,2,3,4-tetrahydronaphthyl, 1,4-dihydronaphthyl, 1-, 2-, 3-, 4- or 5-pyrenyl.

«Heteroaryl» concerns aromatic rings having 5 to 12 carbon atoms or cyclic systems containing 1 to 2 rings fused together or covalently bonded, typically having 5 to 6 carbon atoms; at least one ring of which is aromatic, wherein one or more carbon atoms in one or more of these rings are replaced by oxygen, nitrogen and/or sulfur atoms; the nitrogen and sulfur atoms optionally being oxidized and the nitrogen atoms optionally being quaternized. Said rings can be condensed to an aryl, cycloalkyl, heteroaryl or heterocyclyl group. Nonlimiting examples of heteroaryl groups comprise the groups furanyl, thiophenyl, pyrazolyl, imidazolyl, oxazolyl, isoxazolyl, thiazolyl, isothiazolyl, triazolyl, oxadiazolyl, thiadiazolyl, tetrazolyl, oxatriazolyl, thiatriazolyl, pyridinyl, pyrimidyl, pyrazinyl, pyridazinyl, oxazinyl, dioxinyl, thiazinyl, triazinyl, imidazo [2,1-b][1,3]thiazolyl, thieno[3,2-b]furanyl, thieno[3,2-b]thiophenyl, thieno [2,3-d][I, 3]thiazolyl, thieno[2,3-d]imidazolyl, tetrazolo[I, 5-a]pyridinyl, indolyl, indolizinyl, iso-indolyl, benzofuranyl, isobenzofuranyl, benzothiophenyl, isobenzothiophenyl, indazolyl, benzimidazolyl, benzoxazolyl, 1,3,1,2-benzisoxazolyl, 2,1-benzisoxazolyl, 1,3-benzothiazolyl, 1,2-benzoisothiazolyl, 2,1-benzoisothiazolyl, benzotriazolyl, 1,2,3-benzoxadiazolyl, 2,1,3-benzoxadiazolyl, 1,2,3-benzothiadiazolyl, 2,1,3-benzothiadiazolyl, thienopyridinyl, purinyl, imidazo[1,2-a]pyridinyl, 6-oxo-pyridazine-1(6H)-yl, 2-oxopyridine-1(2H)-yl, 6-oxo-pyridazine-1(6H)-yl, 2-oxopyridin-1(2H)-yl, 1,3-benzodioxolyl, quinolinyl, isoquinolinyl, cinnolinyl, quinazolinyl, quinoxalinyl.

«Carbo-mer» concerns a molecule expanded by insertion of one or more $C_2$ units in all the bonds of a generic set (topologically defined) of bonds of any parent molecule (total carbo-mer, ring carbo-mer, peripheral carbo-mer, carbon skeleton carbo-mer, etc.); this expansion under first approximation maintaining local symmetry, inter-atom connectivity and π resonance of the parent molecule; the prefix «carbo-» is used as global locant to designate a carbon skeleton carbo-mer independently of the substituents, for example: a carbo-benzene; carbo-n-butadiene. In the meaning of the present invention, the term «carbo-mer» does not designate an infinite covalent structure such as graphene, graphyne or graphdiyne. In particular, in the present invention the term «carbo-mer» does not designate a covalent structure in sheet form.

«Carbo-benzene» concerns a carbo-mer constructed by insertion of a $C_2$ unit in each of the bonds of the benzene ring or ring of a substituted derivative of benzene. In the invention, a carbo-benzene is a molecule of general formula:

wherein the substituents $R^i$, i=1-6, may or may not be the same, generally of no more than two types: hydrogen atom groups (—H) of the heteroatomic functions (bonded to the $C_{18}$ macrocycle by a heteroatom); or, more commonly, organic groups: alkyl, alkenyl, alkynyl, aryl, alkylaryl-, alkenylaryl-, alkynylaryl- or heteroaryl-, optionally substituted by at least one alkyl, alkenyl, alkynyl, aryl, heteroaryl, amino (—NH$_2$), carbonitrile (—CN), nitro (—NO$_2$), halogen (—F, —Cl, —Br, —I), hydroxyl (—OH), ether (—O—), oxo (═O), thioether (—S—), thioxo (═S) or sulfhydryl (—SH) group. The alkyl, alkenyl and alkynyl groups can be straight-chain or branched. Preferably, $R^i$, i=1-6 is an alkynylaryl- or phenyl group, optionally substituted by an amino group.

«Carbo-n-butadiene» concerns a carbo-mer constructed by insertion of a $C_2$ unit in each of the bonds of the carbon skeleton of n-butadiene, independently of any optional substituents. In the invention, a carbo-n-butadiene is a molecule of general formula:

wherein the substituents $R_i$, i=1-6, which may or may not be the same, are generally of no more than two types: hydrogen atom groups (—H) of the heteroatomic functions (bonded to the $C_{14}$ straight-chain skeleton by a heteroatom), or, more commonly, organic groups: alkyl, alkenyl, alkynyl, aryl, alkylaryl-, alkenylaryl-, alkynylaryl- or heteroaryl, optionally substituted by at least one alkyl, alkenyl, alkynyl, aryl, heteroaryl, amino (—NH₂), carbonitrile (—CN), nitro (—NO₂), halogen (—F, —Cl, —Br, —I), hydroxyl (—OH), ether (—O—), oxo (═O), thioether (—S—), thioxo (═S), silylalkyl (—Si(R')₃) group where the R' groups are hydrogen atom (—H), alkyl, alkenyl, alkynyl, aryl, alkylaryl-, alkenylaryl-, alkynylaryl- or sulfhydryl (—SH) groups. The alkyl, alkenyl and alkynyl groups can be straight-chain or branched. Preferably $R_i$, i=1-6 is an alkynylaryl- or phenyl group, optionally substituted by an amino group. In one embodiment, the carbo-n-butadiene concerns a carbo-mer constructed by insertion of a $C_2$ unit in each of the bonds of the carbon skeleton and in two non-geminal C—H bonds of n-butadiene, independently of any substituents thereof.

«About» placed in front of a number means to within more or less 10% of the nominal value of this number.

«Hydrogen» concerns the molecule of dihydrogen ($H_2$), unless otherwise indicated.

«Sunlight» or «solar spectrum» concerns all the electromagnetic waves emitted by the Sun, and in particular the solar radiation received on the surface of the Earth. In particular, sunlight comprises visible light.

«Visible light» or «visible spectrum» concerns that part of the electromagnetic spectrum that is visible for a human being i.e. all the monochromatic components of visible light. The International Commission on Illumination defines the visible spectrum as including vacuum wavelengths ranging from 380 nm to 780 nm.

«Nano-catalyst» concerns a nanoparticulate catalyst.

«Three-part nano-catalyst» concerns a nano-catalyst comprising three main elements such as described below.

«Nanoparticulate» concerns an assembly of atoms, at least one of the dimensions thereof being on nanometric scale i.e. less than about 100 nm.

«Nanoparticle» concerns an assembly of atoms having three dimensions on nanometric scale i.e. a particle having a nominal diameter of less than about 100 nm.

«Plasmonic» concerns a resonant interaction obtained under certain conditions between electromagnetic radiation, e.g. visible light, and the free electrons at the interface between a metal («plasmonic metal») and a dielectric material e.g. air. This interaction generates electron density waves called «plasmons» or «surface plasmons». In the invention, a plasmonic metal is silver, gold or copper for example.

«Electromagnetic radiation» or «light» concerns light in the UV, Visible or IR range, preferably sunlight or visible light.

DETAILED DESCRIPTION

Three-Part Nano-Catalyst

The present invention concerns a three-part nano-catalyst comprising or being composed of:
a semiconductor;
nanoparticles of a plasmonic metal; and
an organic photosensitizer.

In one embodiment, the present invention concerns a three-part nano-catalyst comprising or being composed of:
a nanoparticulate semiconductor;
nanoparticles of plasmonic metal; and
an organic photo-sensitizer.

In one embodiment, the three-part nano-catalyst does not comprise or is not composed of a combination of graphene, cadmium sulfide (CdS) and/or platinum (Pt). In one embodiment, the three-part nano-catalyst does not comprise or is not composed of a combination of graphyne, cadmium sulfide (CdS) and/or platinum (Pt). In one embodiment the three-part nano-catalyst does not comprise or is not composed of a combination of graphdiyne, cadmium sulfide (CdS) and/or platinum (Pt).

In one embodiment, the three-part nano-catalyst comprises or is composed of:
a semiconductor in nanoparticulate or nanorod form;
nanoparticles of plasmonic metal; and
an organic photo-sensitizer;
provided that the organic photosensitizer is not in the form of an infinite covalent structure such as a sheet.

In one embodiment, the three-part nano-catalyst is selected from among compounds N1 to N19 described in the following table:

| Ref. Nano-catalyst | Metal oxide Type | Form | Size (nm) | mole % carbobenzene (Cb) | mole % silver |
|---|---|---|---|---|---|
| N1 | ZnO | Particulate | <100 | 1 | 0 |
| N2 | ZnO | Particulate | <100 | 1 | 1 |
| N3 | ZnO | Particulate | <100 | 1 | 3 |
| N4 | ZnO | Particulate | <100 | 1 | 5 |
| N5 | ZnO | Particulate | <50 | 1 | 3 |
| N6 | ZnO | Rod | (diameter × length: 50 nm × 300 nm)- | 1 | 3 |
| N7 | $TiO_2$ | Particulate | 23 | 1 | 0 |
| N8 | $TiO_2$ | Particulate | 23 | 1 | 1 |
| N9 | $TiO_2$ | Particulate | 23 | 1 | 3 |
| N10 | $TiO_2$ | Particulate | 23 | 1 | 5 |
| N11 | $TiO_2$ | Particulate | 23 | 2 | 1 |
| N12 | $TiO_2$ | Particulate | 23 | 2 | 3 |
| N13 | $TiO_2$ | Particulate | 23 | 3 | 3 |
| N14 | $TiO_2$ | Rod | (diameter × length: 10 nm × 10 μm) | 1 | 3 |
| N15 | $TiO_2$ | Particulate | <50 | 2 | 3 |
| N16 | CuO | Particulate | <50 | 1 | 3 |

-continued

| Ref. Nano-catalyst | Metal oxide | | Size (nm) | mole % carbobenzene (Cb) | mole % silver |
|---|---|---|---|---|---|
| | Type | Form | | | |
| N17 | $Fe_2O_3$ | Particulate | <50 | 1 | 3 |
| N18 | NiO | Particulate | <50 | 1 | 3 |
| N19 | $WO_3$ | Particulate | <50 | 1 | 3 |

In one embodiment the three-part nano-catalyst comprises from more than 0% to 10 mole % of carbo-benzene, preferably 1% to 5%, more preferably the three-part nano-catalyst comprises about 2 mole % of carbo-benzene relative to the molar content of Zn in ZnO. In one embodiment, the three-part nano-catalyst comprises 1%, 2%, 3%, 4%, 5%, 6%, 7%, 8%, 9% or 10 mole % of carbo-benzene relative to the molar amount of Zn in ZnO. In embodiment, the three-part nano-catalyst comprises from more than 0% to 10 mole % of carbo-benzene, preferably 1% to 5%, more preferably the three-part nano-catalyst comprises about 2 mole % of carbo-benzene relative to the molar amount of Ti in $TiO_2$. In one embodiment, the three-part nano-catalyst comprises 1%, 2%, 3%, 4%, 5%, 6%, 7%, 8%, 9% or 10 mole % of carbo-benzene relative to the molar amount of Ti in $TiO_2$.

In one embodiment, the three-part nano-catalyst comprises from more than 0% to 10 mole % of carbo-benzene, preferably 1% to 5%, more preferably the three-part nano-catalyst comprises about 2 mole % of carbo-benzene relative to the molar amount of Cu in CuO. In one embodiment, the three-part nano-catalyst comprises 1%, 2%, 3%, 4%, 5%, 6%, 7%, 8%, 9% or 10 mole % of carbo-benzene relative to the molar amount of Cu in CuO.

In one embodiment, the three-part nano-catalyst comprises from more than 0% to 10 mole % of carbo-benzene, preferably 1% to 5%, more preferably the three-part nano-catalyst comprises about 2 mole % of carbo-benzene relative to the molar amount of Fe in $Fe_2O_3$. In one embodiment, the three-part nano-catalyst comprises 1%, 2%, 3%, 4%, 5%, 6%, 7%, 8%, 9% or 10% mole % of carbo-benzene relative to the molar amount of Fe in $Fe_2O_3$.

In one embodiment, the three-part nano-catalyst comprises from more than 0% to 10 mole % of carbo-benzene, preferably from 1% to 5%, more preferably the three-part nano-catalyst comprises about 2 mole % of carbo-benzene relative to the molar amount of Ni in NiO. In one embodiment, the three-part nano-catalyst comprises 1%, 2%, 3%, 4%, 5%, 6%, 7%, 8%, 9% or 10 mole % of carbo-benzene relative to the molar amount of Ni in NiO.

In one embodiment, the three-part nano-catalyst comprises from more than 0% to 10 mole % of carbo-benzene, preferably from 1% to 5%, more preferably the three-part nano-catalyst comprises about 2 mole % of carbo-benzene relative to the molar amount of W in $WO_3$. In one embodiment, the three-part nano-catalyst comprises 1%, 2%, 3%, 4%, 5%, 6%, 7%, 8%, 9% or 10 mole % of carbo-benzene relative to the molar amount of W in $WO_3$.

In one embodiment, the semiconductor is in nanoparticulate or nanorod form. In one embodiment, the nanoparticulate semiconductor is a semiconductor of II-VI type e.g. a nanoparticulate semiconductor metal oxide of II-VI type.

In one embodiment, the nanoparticulate semiconductor metal oxide is tin oxide ($SnO_2$), indium oxide ($In_2O_3$), gallium oxide ($Ga_2O_3$), tungsten oxide ($WO_3$), copper oxide (CuO or $Cu_2O$), nickel oxide (NiO), cobalt oxide (CoO), iron oxide (FeO, $Fe_2O_3$, $Fe_3O_4$), zinc oxide (ZnO) or titanium oxide ($TiO_2$). In one specific embodiment, the semiconductor is titanium oxide ($TiO_2$) or zinc oxide (ZnO). In one specific embodiment, the semiconductor is titanium oxide ($TiO_2$). In one specific embodiment, the semiconductor is zinc oxide (ZnO).

In one embodiment, the nanoparticulate semiconductor is tin oxide ($SnO_2$), indium oxide ($In_2O_3$), gallium oxide ($Ga_2O_3$), tungsten oxide ($WO_3$), copper oxide (CuO or $Cu_2O$), nickel oxide (NiO), cobalt oxide (CoO), iron oxide (FeO, $Fe_2O_3$, $Fe_3O_4$), zinc oxide (ZnO) or titanium oxide ($TiO_2$). In one specific embodiment, the semiconductor is titanium oxide ($TiO_2$) or zinc oxide (ZnO). In one specific embodiment, the semiconductor is titanium oxide ($TiO_2$). In one specific embodiment, the semiconductor is zinc oxide D (ZnO).

In another embodiment, the nanoparticulate semiconductor metal oxide is a mixed oxide such as a metal oxide of spinel type $(X^{2+})(Y^{3+})_2(O^{2-})_4$ where X and Y are two different metals e.g. $CoFe_2O_4$, $ZnFe_2O_4$ or $MnFe_2O_4$; or a metal oxide of perovskite type $(X^{2+})(Y^{4+})(O^{2-})_3$ where X and Y are two different metals e.g. $CaTiO_3$ or $CaSnO_3$.

In another embodiment, the nanoparticulate semiconductor is a mixed oxide such as a metal oxide of spinel type $(X^{2+})(Y^{3+})_2(O^{2-})_4$ where X and Y are two different metals e.g. $CoFe_2O_4$, $ZnFe_2O_4$ or $MnFe_2O_4$; or a metal oxide of perovskite type $(X^{2+})(Y^{4+})(O^{2-})_3$ where X and Y are two different metals e.g. $CaTiO_3$ ou $CaSnO_3$.

In another embodiment, the nanoparticulate semiconductor is a sulfide, equivalent selenide, or equivalent tellurium e.g. ZnS, CuS, CdSe, CdTe, PbS or PbSe.

In one embodiment, the nanoparticulate semiconductor is a semiconductor of III-V type, e.g. GaAs, GaN, InAs or InP.

In another embodiment, the nanoparticulate semiconductor is a mixed semiconductor of types II-VI and III-V, e.g. ZnO:GaN.

In one embodiment, the nanoparticulate semiconductor is solid. In one embodiment, the nanoparticulate semiconductor is partly or fully hollow.

In one embodiment, the nanoparticulate semiconductor is in the form of isotropic or anisotropic nanoparticles. In one embodiment, the nanoparticulate semiconductor is in the form of monocrystalline or polycrystalline nanoparticles.

In one embodiment, the nanoparticulate semiconductor has a mean diameter of between more than 0 nm to 100 nm; preferably from 10 nm to 100 nm; from 20 nm to 100 nm; from 30 nm to 100 nm; from 40 nm to 100 nm; from 50 nm to 100 nm; from 60 nm to 100 nm; from 70 nm to 100 n; from 80 nm to 100 nm or from 90 nm to 100 nm. In one embodiment, the nanoparticulate semiconductor has a mean diameter of about 23 nm. In one embodiment, the nanoparticulate semiconductor has a mean diameter of about 5, 10, 15, 20, 25, 30, 35, 40, 45, 50, 55, 60, 65, 70, 75, 80, 85, 90, 95 or 100 nm. In one embodiment, the nanoparticulate semiconductor has a mean diameter of about more than 0 nm to 50 nm; preferably from 10 nm to 50 nm; from 15 nm to 50 nm; from 20 nm to 50 nm; from 25 nm to 50 nm; from 30 nm to 50 nm; from 35 nm to 50 nm; from 40 nm to 50 nm; or from 45 nm to 50 nm.

In one embodiment, the nanoparticulate semiconductor is zinc oxide (ZnO) in the form of particles having a mean diameter ranging from more than 0 nm to 100 nm. In one embodiment, the nanoparticulate semiconductor is zinc oxide (ZnO) in the form of particles having a mean diameter ranging from more than 0 nm to 50 nm. In one embodiment, the semiconductor is zinc oxide (ZnO) in the form of nanorods. In one embodiment, the nanoparticulate semiconductor is titanium oxide ($TiO_2$) in the form of particles having a mean diameter of 23 nm. In one embodiment, the semiconductor is titanium oxide ($TiO_2$) in the form of nanorods. In one embodiment, the nanoparticulate semiconductor is titanium oxide ($TiO_2$) in the form of particles having a mean diameter of more than 0 nm to 50 nm. In one embodiment, the nanoparticulate semiconductor is copper oxide (CuO) in the form of particles having a mean diameter of more than 0 nm to 50 nm. In one embodiment, the nanoparticulate semiconductor is iron oxide, preferably $Fe_2O_3$, in the form of particles having a mean diameter of more than 0 nm to 50 nm. In one embodiment, the nanoparticulate semiconductor is nickel oxide (NiO) in the form of particles having a mean diameter of more than 0 nm to 50 nm. In one embodiment, the nanoparticulate semiconductor is tungsten oxide ($WO_3$) in the form of particles having a mean diameter of more than 0 nm to 50 nm.

In one embodiment, the nanoparticles of plasmonic metal are nanoparticles of gold (Au), silver (Ag), copper (Cu), aluminium (Al) or platinum (Pt). In one embodiment, the nanoparticles of plasmonic metal are nanoparticles of gold (Au), silver (Ag) or copper (Cu). In another embodiment, the nanoparticles of plasmonic metal are nanoparticles of aluminium (Al) or platinum (Pt). In one specific embodiment, the nanoparticles of plasmonic metal are nanoparticles of gold (Au). In another specific embodiment, the nanoparticles of plasmonic metal are nanoparticles of silver (Ag). In another specific embodiment, the nanoparticles of plasmonic metal are nanoparticles of copper (Cu). In one embodiment, the nanoparticles of plasmonic metal are a mixture of nanoparticles of at least two plasmonic metals. In one embodiment, the nanoparticles of plasmonic metal are composed of a mixture of nanoparticles of at least two plasmonic metals.

Advantageously, the nanoparticles of plasmonic metal e.g. nanoparticles of gold (Au), silver (Ag) or copper (Cu), allow and/or facilitate the absorption of electromagnetic radiation by the three-part nano-catalyst in the Visible range. Advantageously, the nanoparticles of plasmonic metal e.g. nanoparticles of aluminium (Al) or platinum (Pt), allow and/or facilitate the absorption of electromagnetic radiation by the three-part nano-catalyst in the UV range. Advantageously, the nanoparticles of plasmonic meal form a mixture of nanoparticles of at least two plasmonic metals and allow and/or facilitate the absorption of electromagnetic radiation by the three-part nano-catalyst in the UV and/or Visible range, preferably UV and Visible.

In one embodiment, the nanoparticles of plasmonic metal are solid. In one embodiment, the nanoparticles of plasmonic metal are partly or fully hollow. In one embodiment, the nanoparticles of plasmonic metal are isotropic. In one embodiment, the nanoparticles of plasmonic metal are anisotropic. In one embodiment, the nanoparticles of plasmonic metal are monocrystalline or polycrystalline.

In one embodiment, the organic photo-sensitizer has intermolecular self-assembly properties i.e. the photo-sensitizer comprises or is composed of molecules which adopt an arrangement without the need to apply an external power source.

In one embodiment, the organic photosensitizer is an electric conductor i.e. it contains mobile electric charge carriers able to convey an electrical current. Advantageously, the photo-sensitizer has a large capacity to separate charges on account of its moderate aromatic nature and extensive π conjugation, thereby preventing undesired recombination of photo-induced charges.

In one embodiment, the organic photosensitizer absorbs electromagnetic radiation in the UV, Visible and/or IR range e.g. sunlight or visible light. In one embodiment, the photosensitizer absorbs sunlight. In one embodiment, the photosensitizer absorbs visible light. In one embodiment, the electromagnetic radiation absorbed by the photosensitizer generates photo-induced charges. In one embodiment, the photosensitizer is scarcely emissive i.e. it emits little or no electromagnetic radiation.

In one specific embodiment, the photosensitizer has intermolecular self-assembly properties, is an electric conductor and absorbs electromagnetic radiation in the Visible spectrum.

In one embodiment, the organic photosensitizer is a carbo-mer e.g. a carbo-benzene or carbo-n-butadiene.

In one embodiment, the organic photosensitizer is a carbo-benzene, preferably a functionalized carbo-benzene, more preferably a carbo-benzene comprising one or more organic functions, said organic functions comprising at least one heteroatom. In one embodiment, the organic photosensitizer is a carbo-benzene substituted by at least one group selected from among amino, hydroxyl, carboxyl and thiol.

In one embodiment, the photosensitizer is a carbo-benzene, e.g. a compound of formula (I):

where n is between 0 and 3, for example 4-[10-(4-aminophenyl)-4,7,13,16-tetraphenylcyclooctadeca-1,2,3,7,8,9,13,14,15-nonaen-5,11,17-triyn-1-yl]aniline (n=0) or 4,4'((4,7,13,16-tetraphenylcyclooctadeca-1,2,3,7,8,9,13,14,15-nonaen-5,11,17-triyne-1,10-diyl)bis(ethyne-2,1-diyl))dianiline (n=1). In one specific embodiment, the photosensitizer is 4,4'((4,7,13,16-tetraphenylcyclooctadeca-1,2,3,7,8,9,13,14,15-nonaen-5,11,17-triyne-1,10-diyl)bis(ethyne-2,1-diyl))dianiline (n=1).

In one embodiment the photosensitizer is a carbo-n-butadiene, for example 4-{12-[4-aminophenyl]-6,9-diphenyl-1,14-bis[tris(propan-2-yl)silyl]tetradeca-3,4,5,9,10,11-hexaen-1,7,13-triyn-3-yl}-aniline.

In one embodiment, the quantity of nanoparticulate semiconductor in the three-part nano-catalyst is between 99.9% and 30%; preferably between 99% and 50%; more preferably between 90% and 70% by weight relative to the total weight of the three-part nano-catalyst. In one embodiment, the quantity of nanoparticulate semiconductor in the three-part nano-catalyst is 99.9% to 30%; preferably 99.9% to 40%; 99.9% to 50%; 99.9% to 60%; de 99.9% to 70%; 99.9% to 80%; or 99.9% to 90% by weight relative to the total weight of the three-part nano-catalyst. In one embodiment, the quantity of nanoparticulate semiconductor in the three-part nano-catalyst is about 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight relative to the total weight of the three-part nano-catalyst. In one embodiment, the quantity of nanoparticulate semiconductor in the three-part nano-catalyst is 99.9% to 30%; preferably 90% to 30%; 85% to 30%; 80% to 30%; 75% to 30%; 70% to 30%; 65% to 30%; 60% to 30%; 55% to 30%; 50% to 30%; 45% to 30%; 40% to 30%; or 35% to 30% by weight relative to the total weight of the three-part nano-catalyst.

In one embodiment, the quantity of nanoparticles of plasmonic metal in the three-part nano-catalyst is between 0.01% and 10%; preferably between 0.10% and 8%; more preferably between 0.10% and 5% by weight relative to the total weight of the three-part nano-catalyst. In one embodiment the quantity of nanoparticles of plasmonic metal in the three-part nano-catalyst is from 0.01% to 10%; preferably 1% to 10%, preferably 2% to 10%, preferably 3% to 10%, preferably 4% to 10%, preferably 5% to 10%, preferably 6% to 10%, preferably 7% to 10%, preferably 8% to 10%, or preferably 9% to 10% by weight relative to the total weight of the three-part nano-catalyst. In one embodiment, the quantity of nanoparticles of plasmonic metal in the three-part nano-catalyst is between 0.01% and 1%; preferably 0.01% and 0.09%; 0,01% and 0.08%; 0.01% and 0.07%; 0.01% and 0.06%; 0.01% and 0.05%; 0.01% and 0.04%; 0.01% and 0.03%; or 0.01% and 0.02% by weight relative to the total weight of the three-part nano-catalyst. In one embodiment, the quantity of nanoparticles of plasmonic metal in the three-part nano-catalyst is about 1%, 2%, 3%, 4% or 5% by weight relative to the total weight of the three-part nano-catalyst. In one embodiment, the proportion of nanoparticles of plasmonic metal in the three-part nano-catalyst is about 1%, 2%, 3%, 4% or 5%.

In one embodiment, the quantity of organic photosensitizer in the three-part nano-catalyst is between 0.09% and 60%; preferably between 0.90% and 42%; more preferably between 2% and 25% by weight relative to the total weight of the three-part nano-catalyst. In one embodiment, the quantity of organic photosensitizer in the three-part nano-catalyst is 0.09% to 60%; preferably 0,09% to 55%; 0.09% to 50%; 0.09% to 45%; 0.09% to 40%; 0.09% to 35%; 0.09% to 30%; 0.09% to 25%; 0.09% to 20%; 0.09% to 15%; 0.09% to 10%; 0.09% to 5%; or 0.09% to 1% by weight relative to the total weight of the three-part nano-catalyst. In one embodiment, the quantity of organic photosensitizer in the three-part nano-catalyst is about 2, 3, 4, 5, 6, 7, 8, 9, 10, 11, 12, 13, 14, 15, 16, 17, 18, 19, 20, 21, 22, 23, 24 or 25% by weight relative to the total weight of the three-part nano-catalyst. In one embodiment, the proportion of organic photosensitizer in the three-part nano-catalyst is about 2, 3, 4, 5, 6, 7, 8, 9, 10, 11, 12, 13, 14, 15, 16, 17, 18, 19, 20, 21, 22, 23, 24 or 25.

In one embodiment, the proportion of atoms of plasmonic metal in the three-part nano-catalyst is between 0.01% and 30%; preferably between 0.1% and 15%; more preferably between 0.5% and 7 atomic % relative to the number of metal atoms in the nanoparticulate semiconductor. In one embodiment, the proportion of atoms of plasmonic metal in the three-part nano-catalyst is 0.01% to 30%; preferably 0.01% to 25%; 0.01% to 20%; 0.01% to 15%; 0.01% to 10%; 0.01% to 5% or 0.01% to 1%. In one embodiment, the proportion of atoms of plasmonic metal in the three-part nano-catalyst is from 0.1% to 30%; preferably 1% to 30%; 5% to 30%; 10% to 30%; 15% to 30%; 20% to 30%, or 25% to 30%. In one embodiment, the proportion of plasmonic metal atoms in the three-part nano-catalyst is about 1%, 2%, 3%, 4%, 5%, 6% or 7%.

In one embodiment, the quantity of organic photosensitizer in the three-part nano-catalyst is between 0.01% and 30%; preferably between 0.1% and 15%; more preferably between 0.5% and 7 mole %, relative to the molar amount of metal in the nanoparticulate semiconductor. In one embodiment, the quantity of organic photosensitizer in the three-part nano-catalyst is 0.01% to 30%; preferably 0.01% to 25%; 0.01% to 20%; 0.01% to 15%; 0.01% to 10%; 0.01% to 5% or 0.01% to 1 mole %, relative to the molar amount of metal in the nanoparticulate semiconductor. In one embodiment, the quantity of organic photosensitizer in the three-part nano-catalyst is from 0.1% to 30%; preferably 1% to 30%; 5% to 30%; 10% to 30%; 15% to 30%; 20% to 30%, or 25% to 30 mole % relative to the molar amount of metal in the nanoparticulate semiconductor. In one embodiment, the quantity of organic photosensitizer in the three-part nano-catalyst is about 1%; 1.1%; 1.2%; 1.3%; 1.4%; 1.5%; 1.6%; 1.7%; 1.8%; 1.9%; 2%; 3%; 4%; 5%; 6% or 7 mole % relative to the molar amount of metal in the nanoparticulate semiconductor. In one embodiment, the proportion of organic photosensitizer in the three-part nano-catalyst is about 1%; 1.1%; 1.2%; 1.3%; 1.4%; 1.5%; 1.6%; 1.7%; 1.8%; 1.9%; 2%; 3%; 4%; 5%; 6% or 7 mole % relative to the molar amount of metal in the nanoparticulate semiconductor.

In one embodiment, the nanoparticles of plasmonic metal are in contact with the nanoparticulate semiconductor. In one embodiment, the nanoparticles of plasmonic metal are located on the surface of the nanoparticulate semiconductor.

In one embodiment, the nanoparticulate semiconductor and/or nanoparticles of plasmonic metal are coated with the organic photosensitizer. In one embodiment, the nanoparticulate semiconductor is coated with the photosensitizer. In one embodiment, the nanoparticles of plasmonic metal are coated with the photosensitizer. In one embodiment, the nanoparticulate semiconductor and the nanoparticles of plasmonic metal are coated with the photosensitizer.

Advantageously, the coating of the nanoparticulate semiconductor and/or of the nanoparticles of plasmonic metal with the photosensitizer increases the photo-electrochemical efficacy of the three-part nano-catalyst in the UV and/or Visible spectrum, preferably in the Visible spectrum.

Advantageously, the coating of the nanoparticulate semiconductor and/or of the nanoparticles of plasmonic metal with the photosensitizer reduces or prevents corrosion of the nanoparticulate semiconductor and/or of the nanoparticles of plasmonic metal, thereby increasing the lifetime of the three-part nano-catalyst.

Method for Fabricating the Nano-Catalyst

The invention also concerns a method for fabricating a three-part nano-catalyst of the invention, such as previously described.

In one embodiment, the method comprises the following steps:
(1) mixing a nanoparticulate semiconductor with an organic photosensitizer and with a precursor of plasmonic metal nanoparticles; and
(2) irradiating the composition obtained under electromagnetic radiation.

In another embodiment, the method comprises the following steps:
(1a) mixing a nanoparticulate semiconductor with an organic photosensitizer;
(1b) mixing the composition obtained at step (1a) with a precursor of plasmonic metal nanoparticles; and
(2) irradiating the composition obtained at step (1b) under electromagnetic irradiation.

In one embodiment the precursor of plasmonic metal nanoparticles is broken down by photo-reduction or photo-oxidation to give the plasmonic metal in the form of metal nanoparticles. In one embodiment, the breakdown takes place in contact with the nanoparticulate semiconductor.

In one embodiment, the precursor is an organometallic complex of a plasmonic metal. In one embodiment, the precursor is a complex of an amidinate or carboxylate of a plasmonic metal e.g. silver (Ag), gold (Au) or copper (Cu). In another embodiment, the precursor is a nitrate or chloride salt of a plasmonic metal e.g. silver (Ag), gold (Au) or copper (Cu). In one specific embodiment, the precursor is a complex of silver amidinate, preferably silver (N,N'-diisopropylacetamidinate) (Ag).

In one embodiment, the precursor is an amidinate or carboxylate complex with an ion of a plasmonic metal such as silver (Ag), gold (Au) or copper (Cu). In another embodiment, the precursor is a salt of an ion of the plasmonic metal, the ion preferably being the nitrate ion or chloride ion. In one embodiment, the precursor is a complex of silver amidinate, preferably silver (Ag), (N,N'-diisopropylacetamidinate).

In one embodiment, the organic photosensitizer used in the method of the invention is in solution in a solvent e.g. an organic solvent. In one embodiment, the solvent is toluene. In one embodiment, the precursor of plasmonic metal nanoparticles is in solution in a solvent, e.g. an organic solvent. In one embodiment, the solvent is toluene.

In one embodiment, the mixing step (1) (or (1b)) is followed by an agitation step (1-c) at a temperature between 10 and 50° C., preferably at ambient temperature. In one embodiment, the mixing step (1) (or (1b)) is followed by an agitation step (1-c) at a temperature between 10° C. and 50° C., preferably from 10° C. to 40° C., 10° C. to 30° C., or ° C. to 20° C. In one embodiment, the mixing step (1) (or (1b)) is followed by an agitation step (1-c) at a temperature of about 10° C., 11° C., 12° C., 13° C., 14° C., 15° C., 16° C., 17° C., 18° C., 19° C. or 20° C.

In one embodiment, step (1-c) lasts between 10 min and 2 h, preferably 1 h. In one embodiment, step (1-c) lasts 10 min to 120 min, preferably from 10 min to 110 min; 10 min to 100 min; 10 min to 90 min; 10 min to 80 min; 10 min to 70 min; 10 min to 60 min; 10 min to 50 min; 10 min to 40 min; 10 min to 30 min or 10 min to 20 min.

In one embodiment, the irradiation step (2) lasts between 10 min and 48 h, preferably between 10 min and 24 h, more preferably between 30 min and 5 h. In one embodiment the irradiation step (2) lasts 1 h, 2 h, 3 h, 4 h or 5 h. In one embodiment, the irradiation step (2) lasts 10 min, 20 min, 30 min, 40 min, 50 min or 60 min. In one embodiment, irradiation takes place at a temperature of between 10 and 50° C., preferably at ambient temperature. In one embodiment, irradiation takes place at a temperature of from 10° C. to 50° C., preferably 10° C. to 40° C., 10° C. to 30° C., or 10° C. to 20° C. In one embodiment, irradiation takes place at a temperature of about 10° C., 11° C., 12° C., 13° C., 14° C., 15° C., 16° C., 17° C., 18° C., 19° C. or 20° C.

In one embodiment irradiation takes place under agitation. In one embodiment, the electromagnetic radiation is light in the UV, Visible or IR range, preferably sunlight or visible light.

Method for Producing Hydrogen

The invention also concerns a method for producing hydrogen ($H_2$) using a three-part nano-catalyst of the invention such as described in the foregoing.

In one embodiment, hydrogen is produced via photo-reduction reaction of water, activated by the three-part nano-catalyst of the invention. In one embodiment, the three-part nano-catalyst is immersed in the water.

In one embodiment, hydrogen is produced via electrochemical reduction of water. In one embodiment, the hydrogen produced is gaseous. in one embodiment oxygen (dioxygen, $O_2$) is simultaneously produced via electrochemical oxidation reaction of water. In one embodiment, the oxygen produced is gaseous.

Power Source/Power Supply Device

The invention also concerns a power source comprising a three-part nano-catalyst of the invention, such as described in the foregoing. The invention also concerns a power supply device, said device comprising a three-part nano-catalyst of the invention such as described in the foregoing.

In one embodiment, the power supply device is a power source. In one embodiment, the power supply device comprises a power source.

In one embodiment, the power source produces hydrogen using the three-part nano-catalyst of the invention, as previously described. In one embodiment, hydrogen is produced via photo-reduction reaction of water, activated by the three-part nano-catalyst of the invention. In one embodiment, the power source comprises means for storing the hydrogen produced. In one embodiment, the device produces hydrogen using the three-part nano-catalyst of the invention, as previously described. In one embodiment, the device comprises means for storing the hydrogen produced. In one embodiment, when photo-reducing water, the three-part nano-catalyst of the invention remains active after an irradiation time of 60 h, preferably after 70-hour irradiation, more preferably after 80-hour irradiation. In one embodiment, when photo-reducing water, the three-part nano-catalyst of the invention remains active after an irradiation time of 84 h.

In one embodiment, the power source produces electricity from hydrogen. In one embodiment, the device produces electricity from hydrogen.

In one embodiment, the power source is «static», i.e. the dimensions and/or weight thereof are such that it cannot easily be transported by one person alone. In another embodiment, the power source is «mobile», i.e. the dimensions and weight thereof are such that it is able to be transported by one person alone for at least one day, preferably for at least one week, more preferably for at least one month. In one embodiment, the device is static or mobile.

Advantageously, the power source and/or device of the invention enable a user to consume electricity when there is no connection to the electrical grid.

Method for Producing Electrical Energy

The invention also concerns a method for producing electricity comprising the use of the three-part nano-catalyst of the invention such as described in the foregoing.

In one embodiment, the method for producing electricity comprises at least one step to use the power source and/device of the invention such as described above.

In one embodiment, the method for producing electricity comprises at least one step to produce dihydrogen.

In one embodiment, the production rate of dihydrogen in gaseous phase is between more than 0 and 100 $\mu mol \cdot h^{-1} \cdot g^{-1}$; preferably from $1.10^{-6}$ to 10 $\mu mol \cdot h^{-1} \cdot g^{-1}$; more preferably $1.10^{-4}$ to 3 $\mu mol \cdot h^{-1} \cdot g^{-1}$. In one embodiment, the production rate of dihydrogen in gaseous phase is $5.10^{-3}$ $\mu mol \cdot h^{-1} \cdot g^{-1}$. In one embodiment, the production rate of dihydrogen in gaseous phase is $12.2 \times 10^{-3}$ $\mu mol \cdot h^{-1} \cdot g^{-1}$. In one embodiment the production rate of dihydrogen in gaseous phase is $17.2 \times 10^{-3}$ $\mu mol \cdot h^{-1} \cdot g^{-1}$. In one embodiment, the production rate of dihydrogen in gaseous phase is $6.10^{-3}$ $\mu mol \cdot h^{-1} \cdot g^{-1}$. In one embodiment, the production rate of dihydrogen in gaseous phase is 0.029 $\mu mol \cdot h^{-1} \cdot g^{-1}$. In one embodiment, the production rate of dihydrogen in gaseous phase is $7.9 \times 10^{-3}$ $\mu mol \cdot h^{-1} \cdot g^{-1}$. In one embodiment, the production rate of dihydrogen in gaseous phase is 0.015 $\mu mol \cdot h^{-1} \cdot g^{-1}$. In one embodiment, the production rate of dihydrogen in gaseous phase is 0.085 $\mu mol \cdot h^{-1} \cdot g^{-1}$. In one embodiment the production rate of dihydrogen in gaseous phase is 0.41 $\mu mol \cdot h^{-1} \cdot g^{-1}$. In one embodiment, the production rate of dihydrogen in gaseous phase is 0.5 $\mu mol \cdot h^{-1} \cdot g^{-1}$. In one embodiment, the production rate of dihydrogen in gaseous phase is 2.2 $\mu mol \cdot h^{-1} \cdot g^{-1}$. In one embodiment, the production rate of dihydrogen in gaseous phase is 2.7 $\mu mol \cdot h^{-1} \cdot g^{-1}$. In one embodiment, the production rate of dihydrogen in gaseous phase is 1.4 $\mu mol \cdot h^{-1} \cdot g^{-1}$.

EXAMPLES

The present invention will be better understood on reading the examples below illustrating but not limiting the invention.

Abbreviations

NP: nanoparticle;

F-P: Fisher-Porter;

BAG: Glove-box;

TEM: Transmission Electron Microscopy;

HRTEM: High Resolution Transmission Electron Microscopy;

PS: photosensitizer.

Material

The semiconductor in nanoparticulate state used was composed of nanoparticles (NPs) of commercial ZnO (nanopowder, size<100 nm, Sigma-Aldrich).

The plasmonic nanoparticles used were NPs of silver derived from photo-reduction of a silver amidinate complex, silver (N,N'-diisopropylacetamidinate), obtained with the method developed by Gordon [Lim, B. S.; Rahtu, A.; Park, J.-S.; Gordon, R. G., *Inorg. Chem.*, 2003, 42(24), 7951-7958].

The organic photosensitizer used (PS), of carbo-benzene type, was the compound «4,4'((4,7,13,16-tetraphenylcyclooctadeca-1,2,3,7,8,9,13,14,15-nonaen-5,11,17-triyne-1, 10-diyl)bis(ethyne-2,1-diyl))dianiline», of formula:

obtained following the synthesis method developed by the team led by R. Chauvin for a similar compound [Rives, A.; Baglai, I; Malytskyi, V.; Maraval, V.; Saffon-Merceron, N.; Voitenko, Z.; Chauvin, R. *Chem. Commun.*, 2012, 48, 8763-8765].

Figure 1:
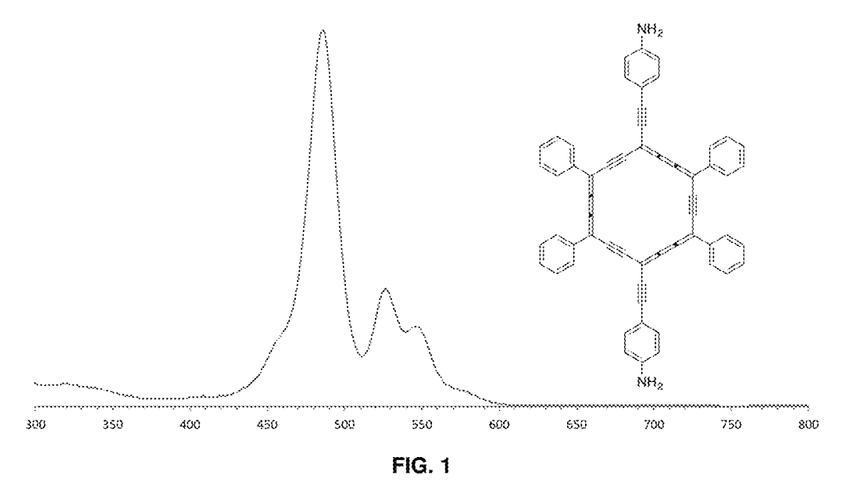
FIG. 1 is a schematic showing the general UV-Visible absorption spectrum of the molecule of carbo-benzene type, illustrated in the schematic.

The UV-Visible absorption spectrum of this compound is given in FIG. 1.

Example 1: Fabrication of a Two-Part Nano-Catalyst, Without Organic Photosensitizer Method 1/ 60 mg of commercial ZnO were degassed in a small Fisher-Porter (F-P) bottle, then placed in a glovebox (BAG).

2/ 20 mg of silver amidinate complex in solution in 5 mL of dry, degassed toluene were added. This amount corresponds to 20 atomic % of Ag relative to the atoms of Zn in ZnO.

3/ A white precipitate was observed in the solution, which was subjected to UV radiation (100 W Mercury lamp) for 2 h.

4/ After manual agitation, occurrence of a yellow suspension. Observation under TEM.

At a second test, procedure was carried out with an exposure time to UV radiation of 30 min and under agitation. A yellow supernatant was also observed in this case.

Results

The TEM images of the complex obtained at steps 1/ to 4/ show NPs of Ag distributed over the carbon film of the microscope screen, indicating that there remains silver amidinate complex in the reaction medium that has not reacted. Also, observation of the yellow supernatant indicates that NPs of Ag have been formed in solution and not on the surface of ZnO.

Direct photo-reduction of the silver amidinate complex via UV radiation of the NPs of ZnO does not therefore allow growth of the NPs of Ag in the absence of a ligand.

An organic molecule («ligand») acting as stabilizing agent is needed to stabilize the formed NPs of Ag. In Examples 2 to 4, an organic photosensitizer (of carbo-benzene type) was used which fulfils this role of ligand in the fabrication method of the nano-catalyst.

Example 2: Fabrication of a Three-Part Nano-Catalyst in the Presence of UV and/or Visible Radiation (5% Aci, 5% carbo-benzene)

Method

1/ 2.15 mg of commercial ZnO were degassed in a small F-P bottle, then placed in a glovebox BAG.

2/ 1.0 mL of carbo-benzene in solution in dry, degassed toluene (1.0 mg/mL) were added. This amount of carbo-benzene (1.0 mg) corresponds to 5 mole % of carbo-benzene relative to the molar amount of Zn in ZnO.

3/ The resulting mixture was left under agitation at ambient temperature in the glovebox BAG for 1 h.

4/ 5 mL of dry, degassed toluene were added.

5/ In parallel a 0.36 mg/mL solution of silver amidinate was prepared from 18 mg solubilized in 50 mL of dry, degassed toluene. This amount corresponds to 5 atomic % of Ag relative to the Zn atoms in ZnO.

6/ 6 mL of this solution were placed in a Schlenk tube containing the previously prepared solution of NPs of ZnO+ carbo-benzene.

7/a—The solution obtained after step 5/was illuminated under UV for 1 h (100 W Mercury lamp).

Figure 2:
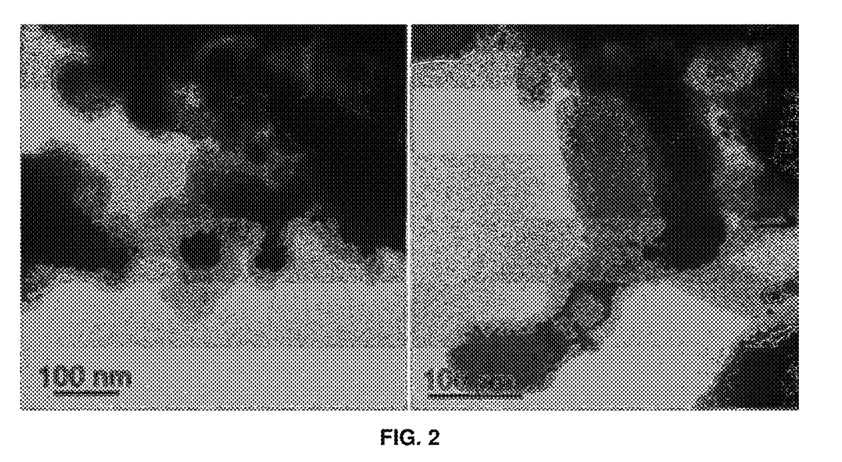
FIG. 2 is a photograph showing TEM observations of nano-objects formed after irradiation under UV only (Example 2a-).
Figure 3:
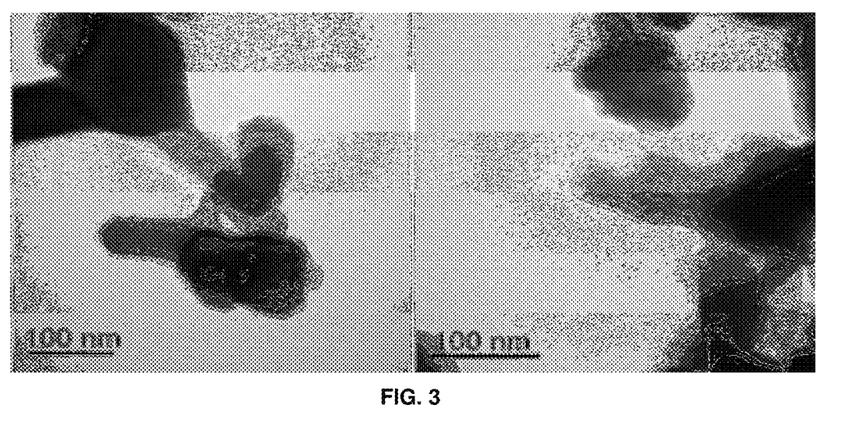
FIG. 3 is a photograph showing TEM observations of nano-objects formed after irradiation under UV only at D+134 (Example 2a-).

8/a—TEM analysis was performed immediately after this operation (FIG. 2) then at D+134 (FIG. 3).

Steps 1/to 6/were repeated after which:

7/b—The solution obtained after step 5/was placed in sunlight (UV+Visible ranges) for several hours.

Figure 4:
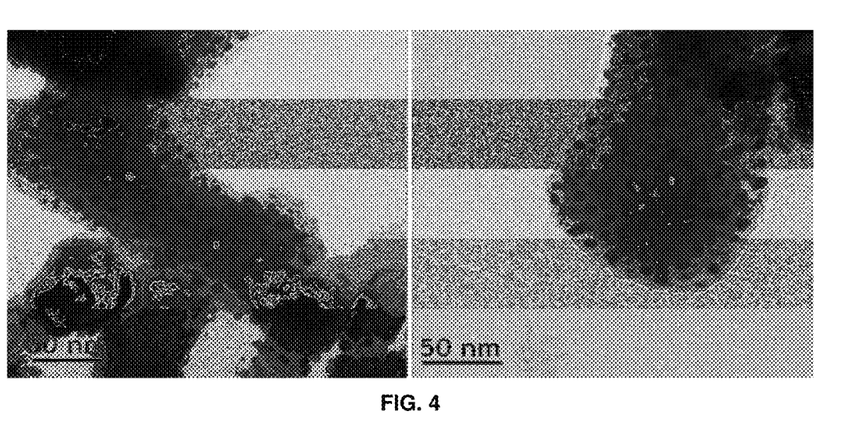
FIG. 4 is a photograph showing TEM observations of nano-objects formed after irradiation in the UV+Visible ranges (Example 2b-).
Figure 5:
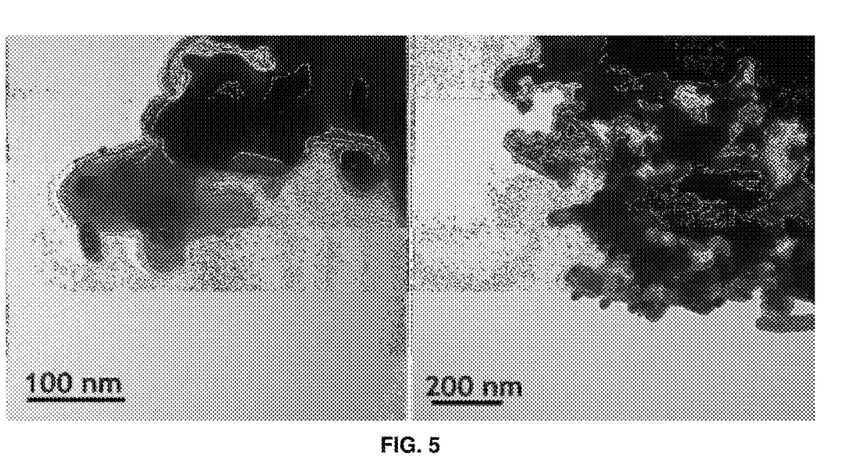
FIG. 5 is a photograph showing TEM observations of nano-objects formed after irradiation in the UV+Visible ranges at D+134 (Example 2b-).

8/b—TEM analysis was performed immediately after this operation (FIG. 4) then at D+134 (FIG. 5).

Steps 1/to 6/were repeated, after which:

7/c—The solution obtained after step 5/was placed in sunlight in a UV-filtered clean room (Visible range only) for several hours.

Figure 6:
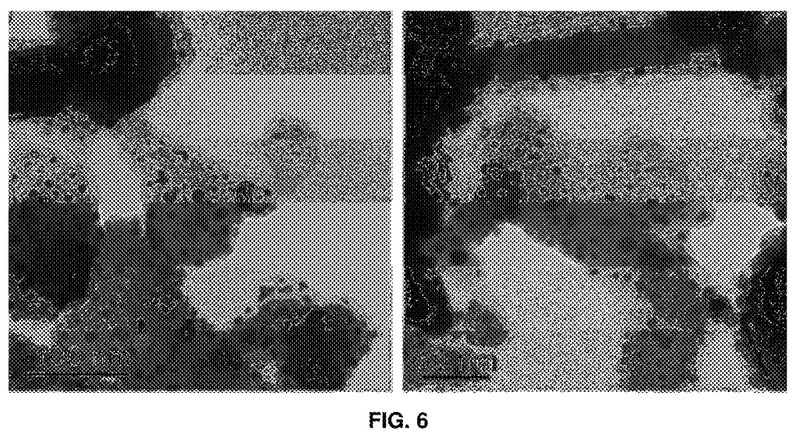
FIG. 6 is a photograph showing TEM observations of nano-objects formed after irradiation in the Visible range only (Example 2c-).
Figure 7:
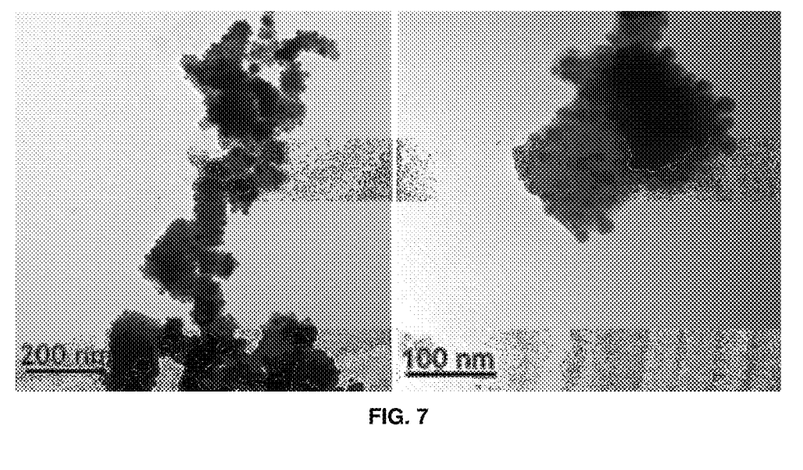
FIG. 7 is a photograph showing TEM observations of nano-objects formed after irradiation in the Visible range only at D+134 (Example 2c-).

8/c—TEM analysis was performed immediately after this operation (FIG. 6) then at D+134 (FIG. 7).

Results

TEM images show that, irrespective of the irradiation source (Visible range only FIGS. 6 and 7; UV range only FIGS. 2 and 3; UV+Visible range, FIGS. 4 and 5), a deposit of Ag NPs occurs on the surface of the NPs of ZnO. These NPs of Ag have a size of approximately 8 nm±1 nm. The TEM images also show that carbo-benzene organizes itself into the form of an organic layer which can be seen on the surface of the NPs of Ag and on the surface of the NPs of ZnO.

It is known that ZnO in the nanoparticulate state and under UV radiation (□≈350 nm) produces electron-hole pairs. The electron and hole migrate towards the surface of ZnO to be used in reduction and oxidation reactions respectively.

This experiment showed four effects of the carbo-benzene used as photosensitizer (PS):
(1) formation of a colloidal solution of the NPs of ZnO in the solvent used (here dry, degassed toluene). In the absence of carbo-benzene, the NPs of ZnO are found in the form of a suspension in the solvent used and not in colloidal form;
(2) stabilization of the NPs of Ag formed after photo-reducing the silver amidinate complex. Contrary to the observation made in the absence of carbo-benzene (Example 1), here all the NPs of Ag are in contact with the surface of the NPs of ZnO and not isolated;
(3) formation of a protective organic layer on the surface of the NPs of ZnO and of the NPs of Ag;
(4) generation of electron/hole pairs within the ZnO after Visible radiation (whether or not associated with UV radiation). Procedures 2a-, 2b- and 2c-, which were performed under different radiation conditions (UV only, Visible only, and UV+Visible), did not exhibit any notable difference regarding the formation of NPs of Ag via photo-reduction of silver amidinate. Conversely, in the absence of photosensitizer, the NPs of ZnO only directly create electron/hole pairs under UV radiation.

Example 3: Fabrication of a Three-Part Nano-Catalyst in the Absence of UV Radiation (1% Ag, 1% Carbo-Benzene)

Method

1/2.1 mg of commercial ZnO were degassed in a small F-P bottle and placed in a glovebox BAG. 2/0.2 mL of carbo-benzene solution in solution in dry, degassed toluene (1.0 mg/mL) with 1 mL of dry, degassed toluene were added. This amount of carbo-benzene (0.2 mg) corresponds to 1 mole % of carbo-benzene relative to the molar amount of Zn in ZnO.

3/In parallel, a 0.36 mg/mL solution of silver amidinate was prepared from 18 mg in 50 mL of dry, degassed toluene. This amount corresponds to 1 atomic % of Ag relative to the Zn atoms in ZnO.

4/0.4 mL of this solution were placed in the small F-P bottle containing the previously prepared solution of NPs of ZnO+carbo-benzene, followed by the addition of 1 mL of dry, degassed toluene.

5/A septum was placed on the small F-P bottle for later sampling and the bottle wrapped in inactinic paper (to allow filtering of UV radiation).

6/The solution was exposed to the luminosity of a clean room (UV-filtered room). A sample of the solution was taken at regular time intervals for TEM observation: 30 min, 1 h, 3 h, 20 h.

Results

The TEM images of the different samples of solution show that on and after 30 min, there occurs formation of the NPs of Ag via photo-reduction of the silver amidinate complex. Nevertheless, NPs of Ag alone can also be seen on the carbon film of the TEM screen indicating that one portion of the silver amidinate complex has not reacted.

Observations at 1 h and 3 h show identical results.

On the other hand, after 20-hour irradiation in the Visible range only, there are no longer any NPs of Ag alone on the carbon film of the microscope screen, indicating that the entirety of the silver amidinate has been photo-reduced.

As in Example 2, all the NPs of Ag observed are located on the surface of the NPs of ZnO, and the carbo-benzene organizes itself in the form of an organic layer visible on the surface of the NPs of Ag and on the surface of the NPs of ZnO.

These results show that carbo-benzene indeed acts as photosensitizer for ZnO under Visible radiation. Since the NPs of ZnO are unable directly to produce electron/hole pairs (since the UV range has been filtered), it is necessarily the carbo-benzene which absorbs Visible radiation (having regard to its profile under UV-Visible spectroscopy, the absorption maximum lies at $\lambda_{max}$=493 nm) and which transfers radiation energy to the NPs of ZnO so that the latter produce electron/hole pairs which will participate in the photo-reduction of the silver amidinate complex.

Contrary to the results in Example 2, irradiation lasting between 3 h and 20 h is needed for complete formation of the NPs of Ag. Several reasons can explain this difference:
- procedure 3 was performed in winter, at a time of year when sunshine hours are considerably reduced and the intensity of solar radiation is low;
- there remained free amidinate ligand in the sample of silver amidinate, which could have been oxidized or reduced instead of the complex itself;
- there was no «impregnation» step of the carbo-benzene around NPs of ZnO, i.e. agitation for 1 h between the NPs of ZnO alone and the carbo-benzene did not take place, contrary to the method in Example 2.

Example 4: Fabrication and Use of a Three-Part Nano-Catalyst (1% Aq, 1% carbo-benzene) in the Absence of UV Radiation for the Photocatalytic Production of Hydrogen Method 1/2.15 mg of commercial ZnO were degassed in a small F-P bottle and placed in a glovebox BAG.

2/0.20 mL of carbo-benzene solution in dry, degassed toluene (1.0 mg/mL) were added with 0.8 mL of dry, degassed toluene. This quantity of carbo-benzene (0.20 mg) corresponds to 1 mole % of carbo-benzene relative to the molar amount of Zn in ZnO.

3/The mixture was agitated at ambient temperature in the glovebox BAG for 15 min.

4/In parallel, a 0.36 mg/mL solution of silver amidinate was prepared from 18 mg in 50 mL of dry, degassed toluene. This quantity corresponds to 1 atomic % of Ag relative to the atoms of Zn in ZnO.

5/0.4 mL of this solution were placed in the small F-P bottle containing the previously prepared solution of NP ZnO+carbo-benzene, to which were added 3.6 mL of dry, degassed toluene (total volume of the solution: 5 mL).

6/The F-P bottle was wrapped in inactinic paper (to allow filtering of UV radiation).

7/The solution was irradiated with a light source in the Visible range only (Xenon lamp, 100 W equipped with a filter blocking out solely UV radiation) under magnetic stirring for 3 h.

Figure 8:
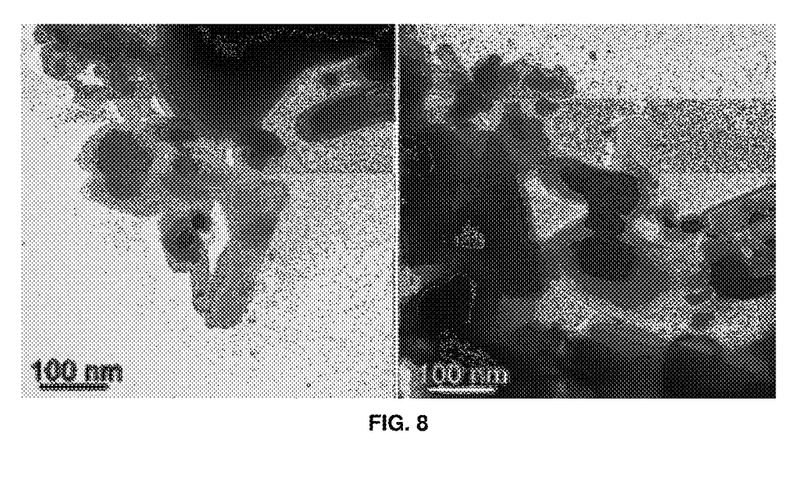
FIG. 8 is a photograph showing TEM observations on the formation of nano-objects after 3-hour irradiation in the Visible range only (Example 4).

8/Observation under TEM was carried out to monitor the formation of the nano-objects and complete photo-reduction of the silver amidinate (FIG. 8).

9/The solution was then concentrated and transferred to pressure-resistant NMR tube.

10/The solvent was entirely evaporated in the NMR tube which was placed in an inert atmosphere with 3 vacuum/argon cycles. 11/200 microlitres of distilled water degassed under a stream of argon were added, the tube placed under argon pressure (100 mbar) and irradiated with a light source emitting in the UV+Visible ranges (Xenon lamp, 100 W) for 45 min.

Figure 9:
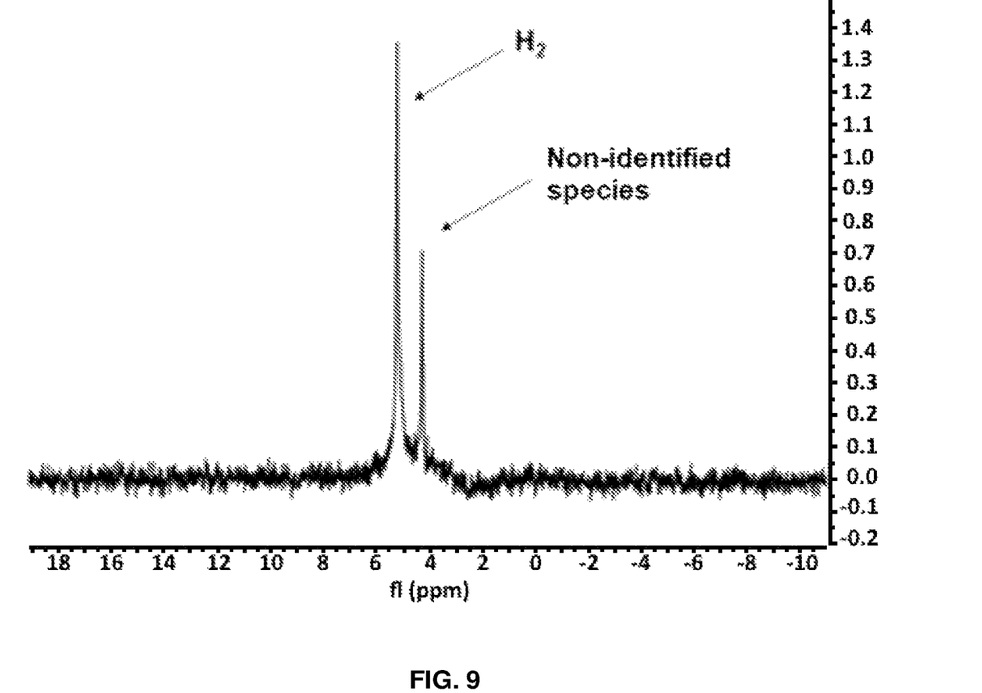
FIG. 9 is a photograph showing the $^1$H NMR spectrum with T2 filter of the gaseous phase after 45-min irradiation in the UV+Visible ranges (Example 4).

12/The presence of dihydrogen $H_2$ was monitored by gas phase $^1H$ NMR spectroscopy with application of a T2 relaxation filter T2 (FIG. 9).

Figure 11:
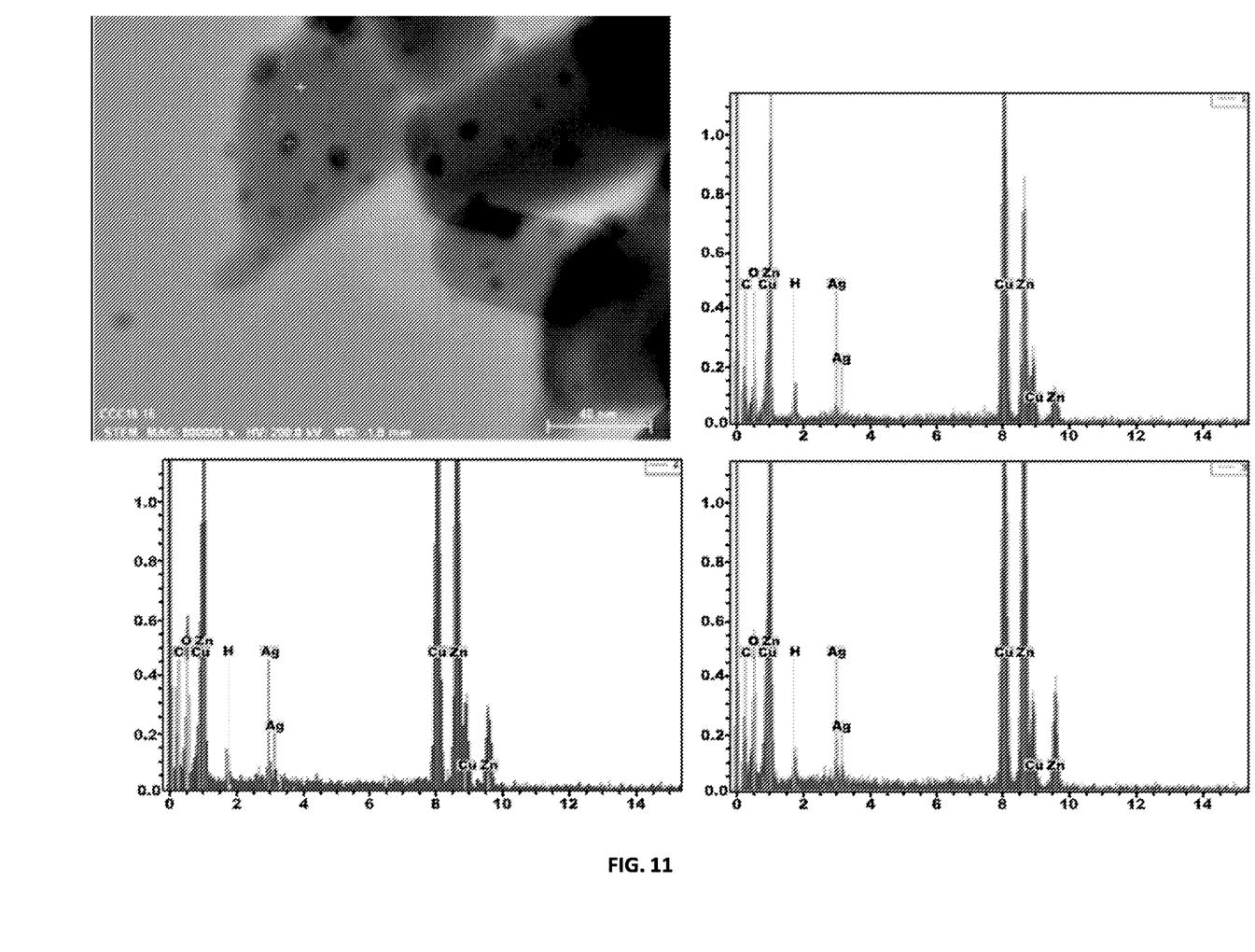
FIG. 11 is a photograph showing EDX analysis performed under HRTEM of the nano-objects at D+20 (Example 4).
Figure 12:
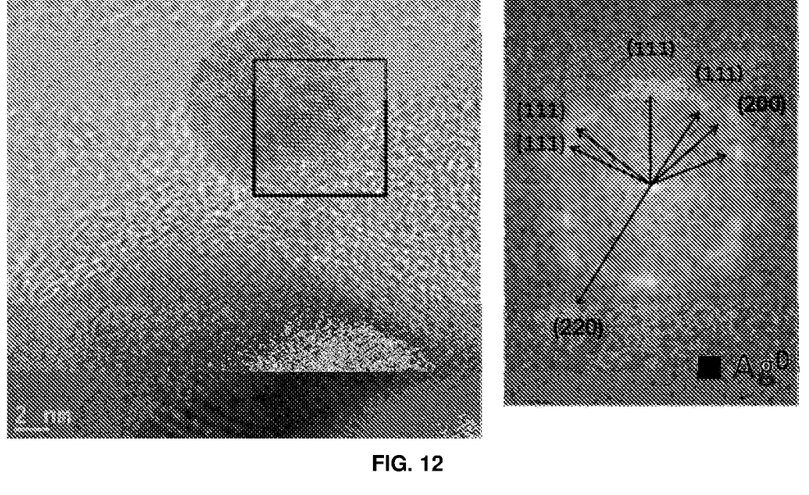
FIG. 12 is a photograph showing analysis of the diffraction configuration of a nanoparticle (NP) of Ag deposited on the surface of a NP of ZnO derived from the nano-objects at D+20 (Example 4).

13/Observation was carried out under HRTEM (High Resolution TEM, FIG. 10), followed by EDX analysis at D+20 (FIG. 11) and representation of the diffraction configuration of a NP of Ag deposited on the surface of a NP of ZnO at D+20 of the nano-objects formed (FIG. 12).

Results

Monitoring of irradiation for the formation of NPs of Ag (FIG. 8) shows that the photo-reduction of the silver amidinate complex takes place after 3-hour irradiation.

Photo-reduction of water was followed by gas phase $^1H$ NMR with application of a T2 relaxation filter allowing cancellation of the water signal in vapour phase (saturation vapour pressure). Two narrow signals were observed after application of this T2 filter: one corresponding to dihydrogen $H_2$ ($\delta \approx 5$ ppm) and the other corresponding to a non-identified, mobile protonated gas species ($\delta \approx 4$ ppm) (FIG. 9).

Figure 10:
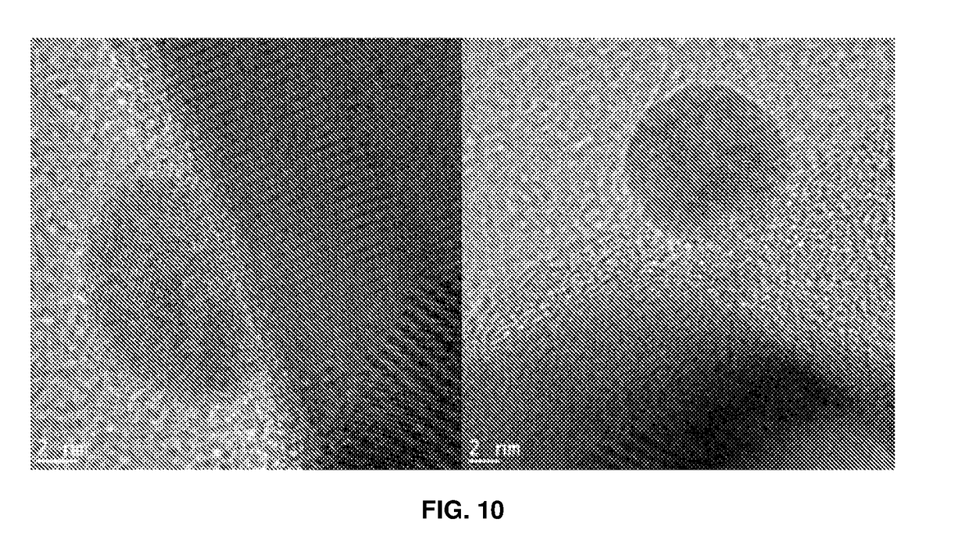
FIG. 10 is a photograph showing observation under HRTEM of the nano-objects at D+20 (Example 4).

Observations under HRTEM of the nano-objects at D+20 showed that the NPs of Ag are deposited either directly on the NPs of ZnO, or on the organic layer of carbo-benzene (FIG. 10).

EDX analyses allowed evidencing of the formation of NPs of Ag on the surface of ZnO (FIG. 11).

Analyses of the diffraction configuration of a NP of Ag deposited on the surface of a NP of ZnO (FIG. 12) show that the deposited nanoparticles of silver are not oxidized in contact with water. This observation allows envisaging of overall photoelectrolysis of water i.e. reduction of water (formation of gaseous dihydrogen $H_2$) and oxidation of water (formation of gaseous dioxygen $O_2$) at the same time. Here by «overall photoelectrolysis of water» is meant the chemical breakdown of water, leading to the simultaneous formation of gaseous dihydrogen $H_2$ and dioxygen $O_2$.

Example 5: Fabrication and Use of Three-Part Nano-Catalysts in the Absence of UV Radiation for the Photocatalytic Production of Hydrogen The Applicant has synthesized several three-part nano-catalysts following the protocol described in Example 2, by adapting the quantities of carbo-benzene and silver and/or by substituting the particles of zinc oxide by other metal oxides. The compositions of these three-part nano-catalysts are given in the following table.

| Ref. Nano-catalyst | Metal oxide | | | | mole % carbo-benzene (Cb) | mole % silver |
| --- | --- | --- | --- | --- | --- | --- |
| | Type | Form | Size (nm) | Quantity (mg) | | |
| N1 | ZnO | Particulate | <100 | 100 | 1 | 0 |
| N2 | ZnO | Particulate | <100 | 100 | 1 | 1 |
| N3 | ZnO | Particulate | <100 | 100 | 1 | 3 |
| N4 | ZnO | Particulate | <100 | 100 | 1 | 5 |
| N5 | ZnO | Particulate | <50 | 100 | 1 | 3 |
| N6 | ZnO | Rod | diameter × length: 50 nm × 300 nm | 100 | 1 | 3 |
| N7 | $TiO_2$ | Particulate | 23 | 100 | 1 | 0 |
| N8 | $TiO_2$ | Particulate | 23 | 100 | 1 | 1 |
| N9 | $TiO_2$ | Particulate | 23 | 100 | 1 | 3 |
| N10 | $TiO_2$ | Particulate | 23 | 100 | 1 | 5 |
| N11 | $TiO_2$ | Particulate | 23 | 100 | 2 | 1 |
| N12 | $TiO_2$ | Particulate | 23 | 100 | 2 | 3 |
| N13 | $TiO_2$ | Particulate | 23 | 100 | 3 | 3 |
| N14 | $TiO_2$ | Rod | diameter × length: 10 nm × 10 μm | 100 | 1 | 3 |
| N15 | $TiO_2$ | Particulate | <50 | 100 | 2 | 3 |
| N16 | CuO | Particulate | <50 | 100 | 1 | 3 |
| N17 | $Fe_2O_3$ | Particulate | <50 | 100 | 1 | 3 |
| N18 | NiO | Particulate | <50 | 100 | 1 | 3 |
| N19 | $WO_3$ | Particulate | <50 | 100 | 1 | 3 |

These three-part nano-catalysts were characterized before and after use thereof as catalyst, with one or more of the following techniques: transmission electron microscopy (TEM), high resolution TEM (HRTEM), solid phase UV/Visible spectroscopy, fluorescent X-ray spectroscopy (FluoX), X photoelectronic spectroscopy «XPS», infrared spectroscopy «IR», Raman spectroscopy or nuclear magnetic resonance «NMR».

The three-part nano-catalysts were employed for catalysis with the following protocol. In a quartz rector of 135 ml capacity, 30 ml of distilled water and 30 mg of nano-catalyst were mixed and agitated at ambient temperature. The volume of the gas phase was 105 ml. Irradiation was performed with a Xenon UV/Visible lamp of 300-Watt power equipped with an optical fibre.

Monitoring of catalysis (rate of hydrogen production as a function of irradiation time) was carried out by sampling the gas phase every 6 hours.

Figure 13:
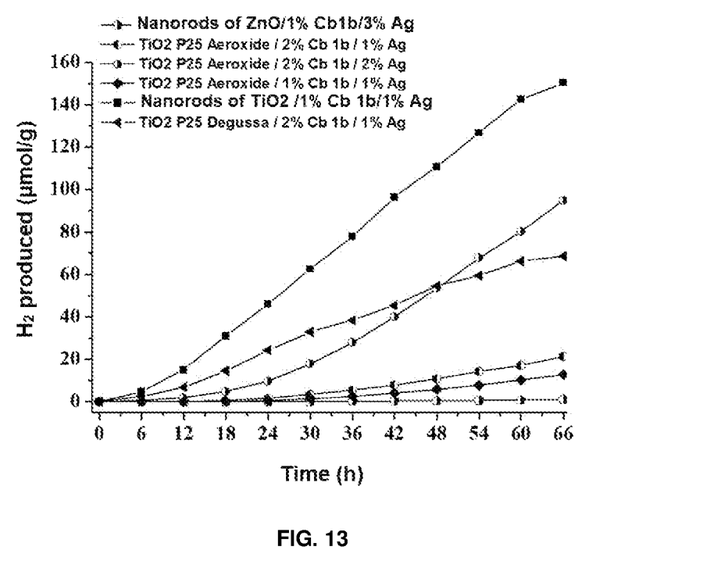
FIG. 13 is a graph giving the trend in the production of dihydrogen in gaseous phase as a function of irradiation time, when photo-reducing water, the reaction being catalyzed by nanorods of zinc oxide/1% carbo-benzene/3% silver; by particles of Aeroxide P25 titanium oxide particles/ 2% carbo-benzene/1% silver; by particles of Aeroxide P25 titanium oxide/2% carbo-benzene/2% silver; by particles of Aeroxide P25 titanium oxide/1% carbo-benzene/1% silver; by nanorods of titanium oxide/1% carbo-benzene/1% silver, or by particles of Degussa P25 titanium oxide/2% carbo-benzene/1% silver.

The results (FIG. 13) show that the best results are obtained with the three-part nano-catalysts $TiO_2$/2% carbo-benzene/3% silver.

In addition, the Applicant measured the production rate of dihydrogen in gas phase using different catalysts after 84-hour irradiation. The results are given in the following table:

| Ref. Nano-catalyst | Type of nano-catalyst | Rate of production of $H_2$ ($\mu mol \cdot h^{-1} \cdot g^{-1}$) |
|---|---|---|
| — | ZnO (<100 nm) | — |
| N1 | ZnO (<100 nm)/1% Cb | $5 \cdot 10^{-3}$ |
| N2 | ZnO (<100 nm)/1% Cb/1% Ag | $12.2 \times 10^{-3}$ |
| N3 | ZnO (<100 nm)/1% Cb/3% Ag | $17.2 \times 10^{-3}$ |
| N4 | ZnO (<100 nm)/1% Cb/5% Ag | $6 \cdot 10^{-3}$ |
| N6 | ZnO nanorods (diameter × length: 50 nm × 300 nm)/1% Cb/3% Ag | 0.029 |
| — | $TiO_2$ P25 Aeroxide ® | $7.9 \times 10^{-3}$ |
| N7 | $TiO_2$ P25 Aeroxide ®/1% Cb | 0.015 |
| N8 | $TiO_2$ P25 Aeroxide ®/1% Cb/1% Ag | 0.085 |
| N9 | $TiO_2$ P25 Aeroxide ®/1% Cb/3% Ag | 0.41 |
| N10 | $TiO_2$ P25 Aeroxide ®/1% Cb/5% Ag | — |
| N11 | $TiO_2$ P25 Aeroxide ®/2% Cb/1% Ag | 0.5 |
| N12 | $TiO_2$ P25 Aeroxide ®/2% Cb/3% Ag | 2.2 |
| N13 | $TiO_2$ P25 Aeroxide ®/3% Cb/3% Ag | 1.4 |
| N14 | $TiO_2$ P25 Degussa/2% Cb/3% Ag | 1.34 |
| N15 | $TiO_2$ nanorods (diameter × length: 10 nm × 10 μm)/1% Cb/3% Ag | 2.45 |

The results show that, even after 84-hour irradiation, the nano-catalysts of the invention still remain active.

In general:
the nano-catalysts comprising titanium oxide are more active than those comprising zinc oxide;
the nano-catalysts in nanorod form are more active than those in nanoparticulate form;
when particulate nano-catalysts are employed, the best results are obtained with nano-catalysts comprising 2% carbo-benzene;
the most active three-part nano-catalyst is composed of $TiO_2$ nanorods/1% carbo-benzene/3% silver.

The invention claimed is:

1. A three part nano-catalyst comprising:
a semiconductor in nanoparticulate or nanorod form;
nanoparticles of plasmonic metal; and
an organic photo-sensitizer that is a carbo-mer.

2. The nano-catalyst according to claim 1, wherein the semiconductor in nanoparticulate or nanorod form is a metal oxide.

3. The nano-catalyst according to claim 1, wherein the plasmonic metal is gold, silver, copper, aluminium or platinum.

4. The nano-catalyst according to claim 1, wherein the carbo-mer is a carbo-benzene.

5. The nano-catalyst according to claim 1, wherein the nanoparticles of plasmonic metal are located on the surface of the semiconductor in nanoparticulate or nanorod form.

6. The nano-catalyst according to claim 1, wherein the semiconductor in nanoparticulate or nanorod form, and/or the nanoparticles of plasmonic metal are coated with the photosensitizer.

7. A method for fabricating a three-part nano-catalyst according to claim 1 comprising the following steps:
(1a) mixing a semiconductor in nanoparticulate or nanorod form with an organic photosensitizer;
(1b) mixing the composition obtained at step (1a) with a complex comprising an ion of a plasmonic metal;
(2) irradiating the composition obtained at step (1b) under electromagnetic radiation.

8. The method according to claim 7, wherein the complex comprising an ion of the plasmonic metal is an amidinate or carboxylate of silver, gold, copper, aluminium or platinum.

9. A process for producing hydrogen comprising applying an effective amount of the three-part nano-catalyst according to claim 1.

10. A power supply device, comprising a three-part nano-catalyst according to claim 1.

11. The three-part nano-catalyst of claim 1, wherein the organic photo-sensitizer is a carbo-benzene or carbo-n-butadiene.

12. The three-part nano-catalyst of claim 2, wherein the semiconductor in nanoparticulate or nanorod form is selected from the group consisting of: tin oxide, indium oxide, gallium oxide, tungsten oxide, copper oxide, nickel oxide, cobalt oxide, iron oxide, zinc oxide and titanium oxide.

13. The method of claim 7, wherein the step (1b) is followed by an agitation step (1c).

14. The method of claim 7, wherein the electromagnetic radiation of step (2) is sunlight.

15. The nano-catalyst according to claim 1, wherein the carbo-mer is selected from the group consisting of 4-[10-(4-aminophenyl)-4,7,13,16-tetraphenylcyclooctadeca-1,2,3,7,8,9,13,14,15-nonaen-5,11,17-triyn-1-yl]aniline or 4,4' ((4,7,13,16-tetraphenylcyclooctadeca-1,2,3,7,8,9,13,14,15-nonaen-5,11,17-triyne-1,10-diyl)bis(ethyne-2,1-diyl)) dianiline.

16. The three-part nano-catalyst of claim 11, wherein the semiconductor in nanoparticulate or nanorod form is selected from the group consisting of: tin oxide, indium oxide, gallium oxide, tungsten oxide, copper oxide, nickel oxide, cobalt oxide, iron oxide, zinc oxide and titanium oxide.

17. The nano-catalyst according to claim 11, wherein the carbo-mer is selected from the group consisting of 4-[10-(4-aminophenyl)-4,7,13,16-tetraphenylcyclooctadeca-1,2,3,7,8,9,13,14,15-nonaen-5,11,17-triyn-1-yl]aniline or 4,4' ((4,7,13,16-tetraphenylcyclooctadeca-1,2,3,7,8,9,13,14,15-nonaen-5,11,17-triyne-1,10-diyl)bis(ethyne-2,1-diyl)) dianiline.

18. The nano-catalyst according to claim 11, wherein the plasmonic metal is gold, silver, copper, aluminium or platinum.

19. The nano-catalyst according to claim 11, wherein the nanoparticles of plasmonic metal are located on the surface of the semiconductor in nanoparticulate or nanorod form.

* * * * *